W. R. ARBOUR & J. W. LEPINE.
AGRICULTURAL MACHINE.
APPLICATION FILED OCT. 30, 1912.
1,080,799.
Patented Dec. 9, 1913.
2 SHEETS—SHEET 2.
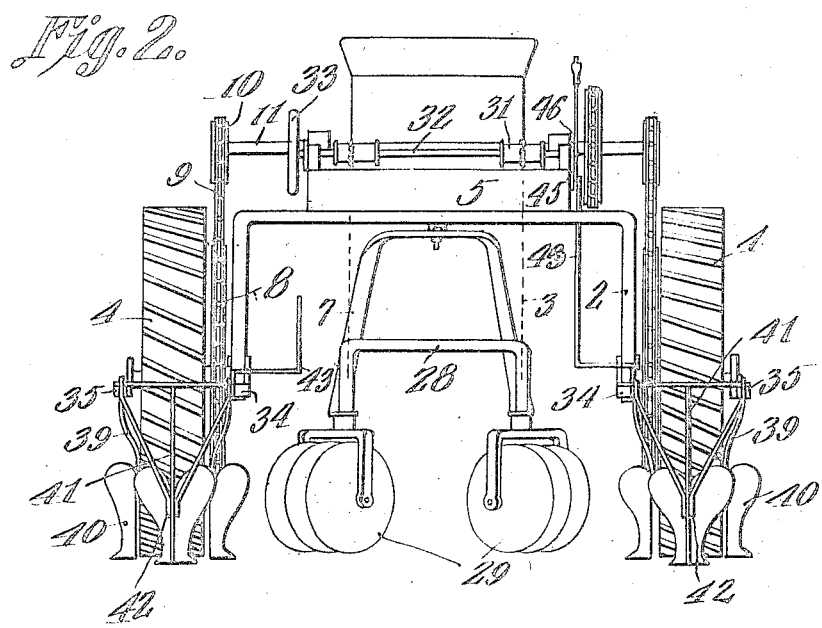
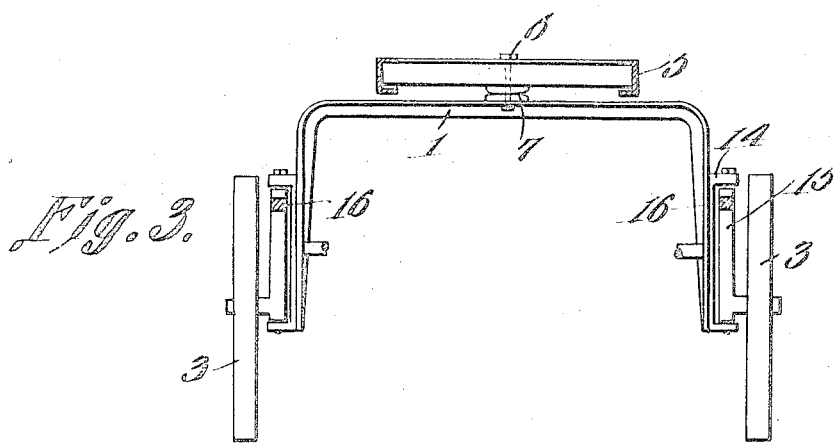
William R. Arbour
J. W. Lepine
Inventors

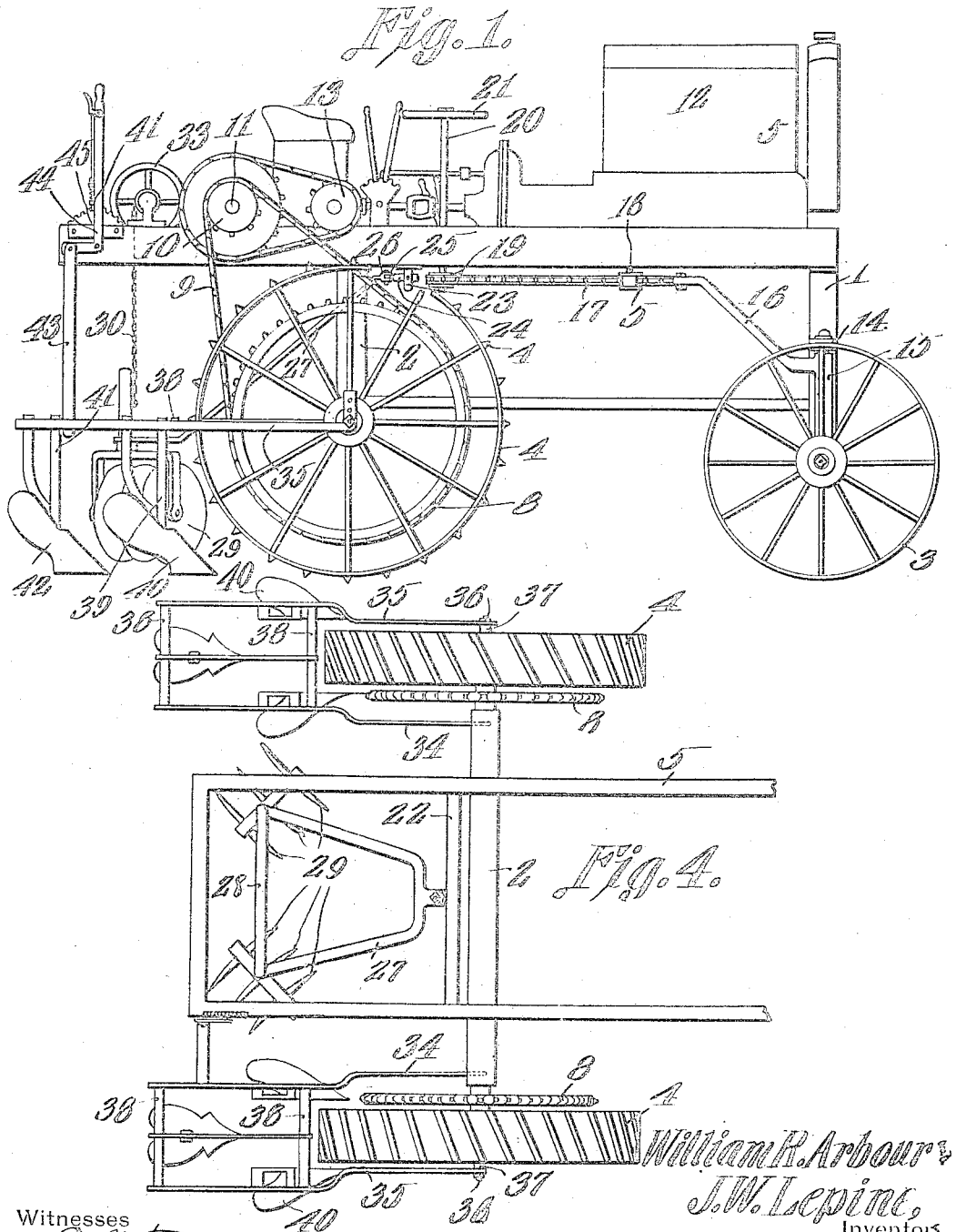

UNITED STATES PATENT OFFICE.

WILLIAM ROLAND ARBOUR AND JOSEPH WILSON LEPINE, OF LAFOURCHE CROSSING, LOUISIANA.

AGRICULTURAL MACHINE.

1,080,799.  Specification of Letters Patent.  Patented Dec. 9, 1913.

Application filed October 30, 1912. Serial No. 728,716.

*To all whom it may concern:*

Be it known that we, WILLIAM R. ARBOUR and JOSEPH W. LEPINE, citizens of the United States, residing at Lafourche Crossing, in the parish of Lafourche, State of Louisiana, have invented a new and useful Agricultural Machine, of which the following is a specification.

This invention relates to agricultural machines and more particularly to a novel form of tractor designed for use in the cultivation of sugar cane and sorghum at all stages of the growth thereof.

One of the objects of the invention is to provide a tractor having high arched axles so proportioned as to straddle the rows at different stages of the growth of the plants, there being means combined with the tractor whereby the plants may be cultivated and draining ditches may be produced adjacent the rows.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a rear elevation thereof. Fig. 3 is a transverse section through the frame of the machine and showing the front axle in elevation. Fig. 4 is a plan view of the rear portion of the machine, the platform and the mechanism supported thereby being removed.

Referring to the figures by characters of reference 1 designates the arched front axle of the machine and 2 designates the arched rear axle thereof, the axle 1 being supported by wheels 3, while the axle 2 is supported by drive wheels 4.

The frame of the machine has been indicated at 5 and is mounted fixedly upon the arched axle 2 and extends over the axle 1, to which it is connected by means of a king bolt 6. The front end of the frame is supported at its center above the axle 1 by bearing blocks 7 and these blocks permit the axle 1 to swing laterally relative to the frame so as thus to be capable of traveling over an uneven surface without either tilting or distorting the front end of the frame.

Each of the drive wheels 4 has a sprocket 8 secured thereto and these sprockets receive motion, through chains 9, from smaller sprockets 10 secured to a shaft 11 which extends transversely of the frame. A motor, which has been indicated generally at 12, is mounted on the front portion of the frame 5 and any suitable mechanism, such as indicated generally at 13, is provided for transmitting motion from the motor to the shaft 11. Inasmuch as this power transmitting mechanism constitutes no part of the present invention, it is not deemed necessary to describe and illustrate the same in detail.

Brackets 14 are arranged upon the side portions of the arched axle 1 and journaled within them are knuckle members 15 having outstanding spindles on which the wheels 3 are journaled. An arm 16 extends rearwardly from each knuckle member 15 and these arms are secured to the ends of a chain 17 which extends partly around guide sheaves 18 and engages a sprocket 19 attached to the lower end of a shaft 20. This shaft extends upwardly within the frame 5 and is provided with a steering wheel 21. Thus it will be seen that by rotating wheel 21, chain 17 can be actuated so as to swing the arm 16 to the right or to the left and thus guide the machine while in operation.

Connected to a cross beam 22, secured in and forming a part of the frame 5, is a hanger 23 to which a coupling plate 24 is pivotally connected so as to swing in a substantially vertical plane. This coupling plate has a tongue 25 at one end which may be pivotally engaged by a forked extension 26 formed at the center of the front end of a frame 27. As shown in the drawings, this frame extends downwardly and rearwardly and its terminals engage the side portions of a yoke 28. Each end of the yoke is provided with a gang of cultivator disks connected thereto in any suitable manner, the two gangs of disks being spaced apart so that said gangs will travel along opposite sides of a row. Chains 30 or other suitable connections extend upwardly from the side portions of the yoke 28 and are attached to spools 31 secured to a shaft 32. This shaft is mounted upon the frame 5 and extends transversely of the rear end portion thereof and a hand wheel 33 is secured to the shaft and by means thereof the shaft can be rotated so as to wind the connections 30 upon the spools 31. Thus it will be seen that the gangs of cultivator disks 29 can be raised and lowered as desired.

For the purpose of digging ditches along the sides of the rows being cultivated, gangs of plows are mounted in a novel manner back of the drive wheels 4 of the machine. This is done by mounting inner and outer side strips 34 and 35 upon the end portions of a bolt 36 which extends through each spindle 37 of the rear axle 2, the strips being detachably secured to the bolt in any suitable manner and being likewise held together back of the wheels 4 by means of cross strips 38. Extending downwardly from each side strip 34 and 35 is a standard 39 and secured to these standards is a single moldboard plow 40. Another standard 41 extends downwardly from the rear cross strip 38 and from the rear ends of the cross strips 34 and 35 and a double moldboard plow 42 is secured thereto. The plows 40 in each group are designed to turn the furrow slices to the right and left respectively and the double moldboard plow following them operates to throw the soil to both sides from the center of the furrow produced by the three plows of the group. As shown particularly in Figs. 2 and 4, the double moldboard plows are disposed directly back of the wheels 4.

It will be apparent that the side strips 34 and 35 and the cross strips 38 form a frame designed to swing about the bolt 36 as a pivot. Connected to each of these frames is a lifting bar 43 the upper end of which is attached to one arm of a bell crank lever 44 carried by the frame 5. Any suitable means, such as a toothed segment 45 and a spring pressed pawl 46, may be employed for locking the bell crank lever against movement.

It will be understood that when the machine is driven forward, the axles 1 and 2 will straddle the row to be cultivated. At the same time the gangs of disks 29 will cultivate the soil close to the sides of the row and the plows 40 and 42 will dig deep furrows along the sides of the row and which constitute means for draining the rows. The cultivator disks can be readily elevated by means of wheel 33 and spools 31 and the plows can also be raised or lowered by manipulating the lever 44.

While the machine has been shown provided with cultivator disks and with ditching plows, it is to be understood that other forms of soil engaging devices may be employed in lieu thereof or in combination therewith. For example, instead of connecting the disks 29 to the center of the machine, as shown, a plow of any suitable type can be arranged under the frame 5 and its beam coupled to the plate 24. This construction is so obvious that it is not deemed necessary to illustrate it.

What is claimed is:—

An agricultural machine including a rear arched axle, propelling wheels supporting the same, a frame straddling each of the wheels and mounted to swing about that portion of the axle engaged by the wheel, soil engaging devices carried by the frame for loosening the soil depressed by the wheel, levers, a non-flexible connection between each lever and one of the frames, said lever and connection constituting means for forcing the soil engaging devices into the soil, means for locking the lever against movement, a yoke interposed between the frames, soil engaging devices carried thereby, and means for raising and lowering the yoke, said yoke and the frames being separately adjustable upwardly and downwardly, the yoke being adapted to swing laterally between the frames.

In testimony that we claim the foregoing as our own, we have hereto affixed our signatures in the presence of two witnesses.

WILLIAM ROLAND ARBOUR.
JOSEPH WILSON LEPINE.

Witnesses:
  C. G. SALLES,
  OSCAR L. CARO.